US006598981B1

(12) United States Patent
Wallach

(10) Patent No.: US 6,598,981 B1
(45) Date of Patent: Jul. 29, 2003

(54) BINOCULAR KALEIDOSCOPE

(76) Inventor: Alfred Wallach, 200 E. 36th St., New York, NY (US) 10016

( * ) Notice: Subject to any disclaimer, the term of this patent is extended or adjusted under 35 U.S.C. 154(b) by 0 days.

(21) Appl. No.: 10/106,965

(22) Filed: Mar. 28, 2002

(51) Int. Cl.[7] ............................................. G02B 27/08
(52) U.S. Cl. ...................................................... 359/616
(58) Field of Search ................................ 359/616, 617; 472/63

(56) References Cited

U.S. PATENT DOCUMENTS

| | | | | |
|---|---|---|---|---|
| 4,815,801 A | * | 3/1989 | Anderson | 359/616 |
| 4,820,004 A | * | 4/1989 | Briskin | 359/616 |
| 5,020,870 A | * | 6/1991 | Gray | 359/616 |
| 5,225,934 A | * | 7/1993 | Kroll | 359/616 |
| 5,426,474 A | * | 6/1995 | Rubtsov et al. | 359/616 |

* cited by examiner

Primary Examiner—Christopher Mahoney
(74) Attorney, Agent, or Firm—Levine & Mandelbaum

(57) ABSTRACT

A binocular kaleidoscope having a generally V-shaped housing with an opening at the base of the V and the two arms of the V-shaped housing being hollow tubes diverging from the opening. The longitudinal axes of both arms pass through the opening. A moveable image is adjacent to the opening at the base of the V, the image being directly viewable through the opening when looking along the length of each of the arms of the housing, so that when both eyes of a person using the kaleidoscope are brought close to the free ends of the hollow arms of the housing, the moveable image is viewed directly and simultaneously by both eyes. The image is both front and back lit. Each of the housing arms may have triangular cross-sections and mirrored interiors. Each arm is provided with a telescoping extension so that the lengths of the arms, and hence the spacing between the free ends of the arms, is adjustable to conform to the spacing between the eyes of the user. A support mounted on the housing rotatably supports a shaft extending from a carrier bearing the image. The shaft may be rotated by hand to move the image in front of the housing opening. Preferably, the entire housing, except for the moveable telescoping sections, is formed of a single piece of sheet material lined on one surface with a reflective material.

13 Claims, 6 Drawing Sheets

BINOCULAR KALEIDOSCOPE

This invention relates to kaleidoscopes, and more particularly to a binocular kaleidoscope which permits viewing with both eyes simultaneously so as to provide a three-dimensional effect for the viewer.

A conventional kaleidoscope comprises a tube formed with two or three reflective surfaces extending along the length of the tube. The surfaces are positioned at an acute angle or angles to each other so as to be arranged, in cross section, in the shape of a V, in the case of two reflective surfaces, or a triangle, in the case of three reflective surfaces.

A moveable image, which may be pieces of colored glass or a rotating element, is arranged adjacent to one end of the kaleidoscope tube. The viewer looks through the other end of the tube along the axis of the tube so that the line of sight passes between the reflective surfaces. In this way, the viewer sees the image both directly and as reflected by the reflective surfaces.

While most kaleidoscopes are made for viewing with just one eye, binocular kaleidoscopes have been suggested which permit viewing simultaneously with both eyes. Such kaleidoscopes are disclosed in U.S. Pat. Nos. 4,820,004 and 5,020,870.

However, these earlier binocular kaleidoscopes do not offer the advantage of creating a three-dimensional effect when used by a viewer. The reason is that previous binocular kaleidoscopes do not permit a single moveable image to be viewed directly by both eyes, in addition to both eyes receiving the image reflected off the reflective surfaces within the kaleidoscope tube or tubes. By "viewing directly", what is meant is that the image is in the straight line of sight of each eye along the axis of the tube into which each eye is looking. Due to this arrangement, the parallax created when viewing the moveable image simultaneously by two spaced-apart eyes creates a three-dimensional effect not heretofore provided by any other kaleidoscope.

Therefore, it is an object of the present invention to provide a binocular kaleidoscope which offers a three-dimensional effect when viewing a moveable image with both eyes.

It is another object of the invention to provide a binocular kaleidoscope which is inexpensive to manufacture on a mass production basis.

It is a further object of the invention to provide such a kaleidoscope which can be made of foldable sheet material capable of being packaged in a flat condition and set up into a kaleidoscope by the purchaser, thereby reducing transportation and storage costs, as well as shelf space needed to display the product for sale.

It is an additional object of the invention to provide a binocular kaleidoscope in which the spacing between the ends of the tubes which are looked into are adjustable to conform to the spacing between the users eyes.

It is still another object of the invention to provide a binocular kaleidoscope wherein the holder for rotatably mounting the moveable image may be made as a unitary construction with the remainder of the kaleidoscope body.

It is a further object of the invention to provide a binocular kaleidoscope in which the moveable image is illuminated by light reaching both its front and rear surfaces.

Additional objects and features of the present invention will be apparent from the following description in which reference is made to the accompanying drawings.

Figure 1:
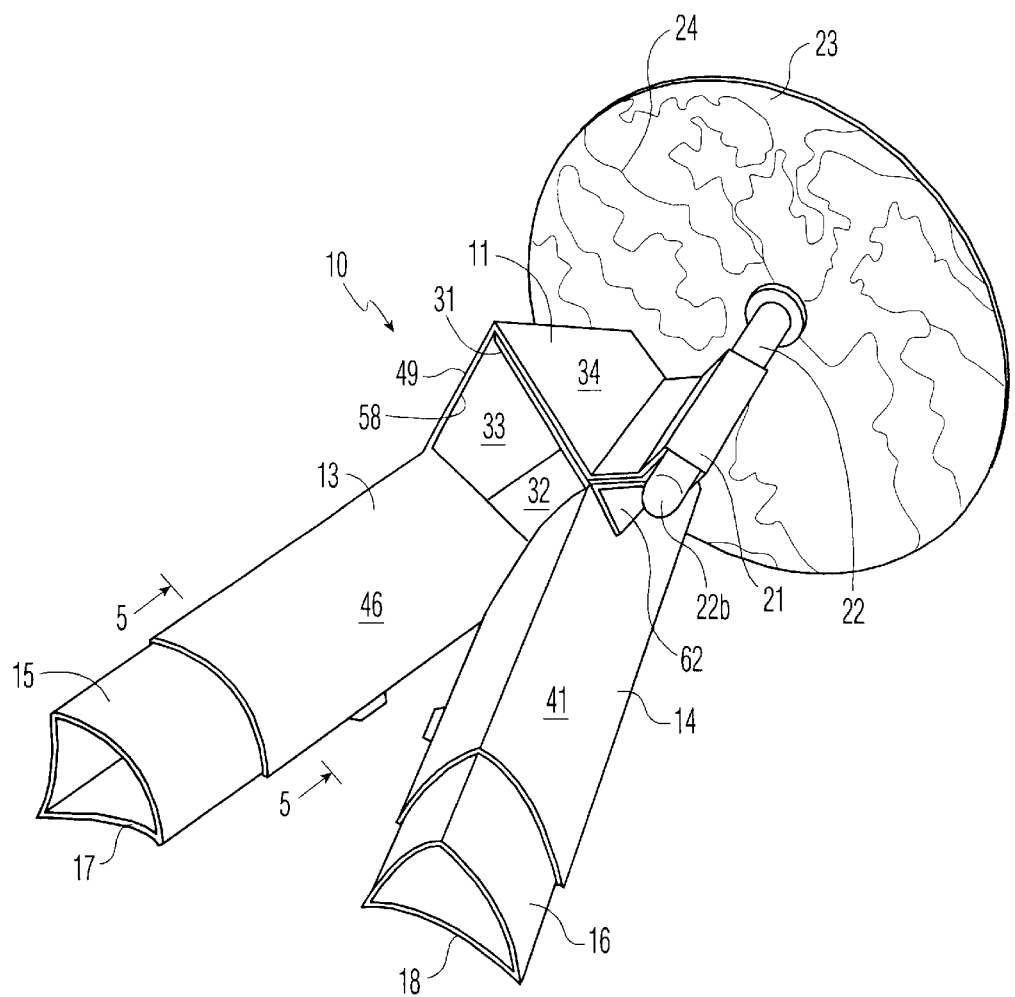
FIG. 1 is a perspective view of a binocular kaleidoscope according to the present invention.
Figure 2:
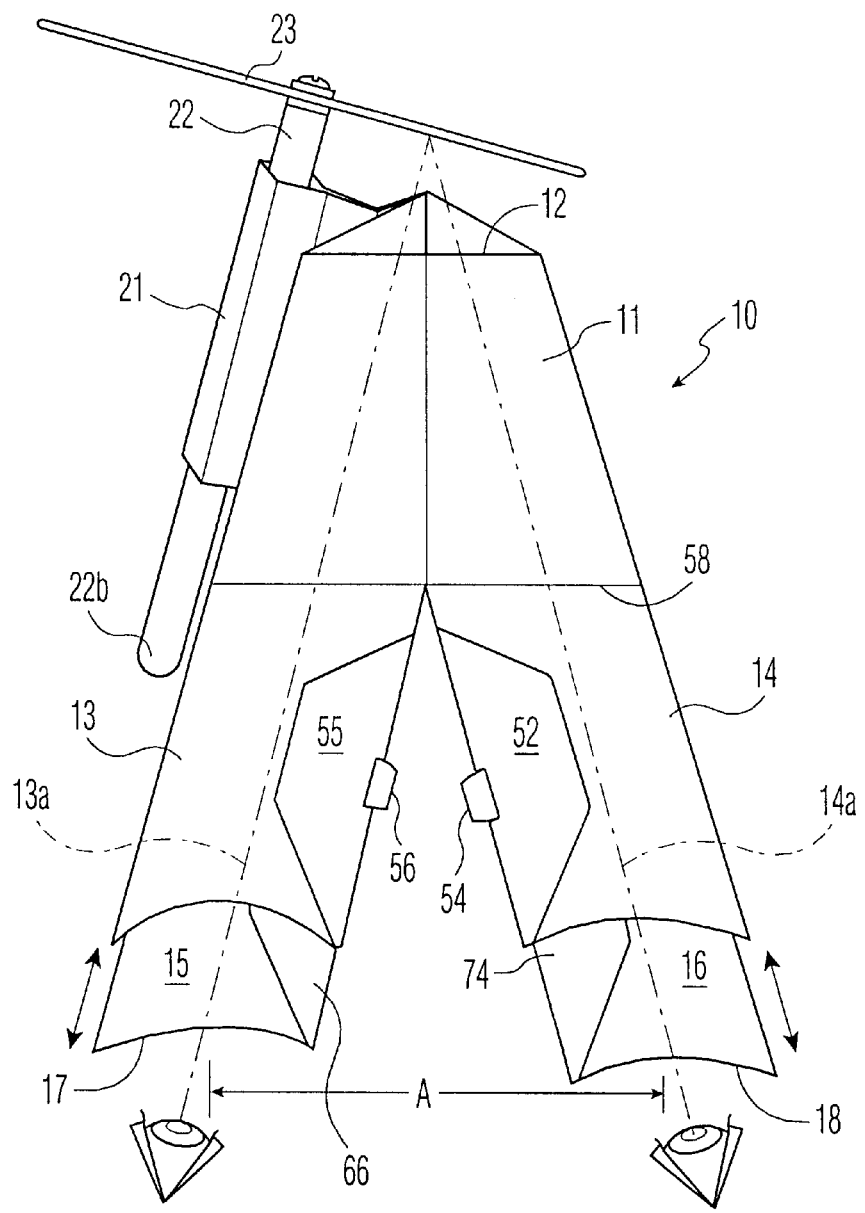
FIG. 2 is a bottom plan view of the kaleidoscope of FIG. 1.
Figure 7:
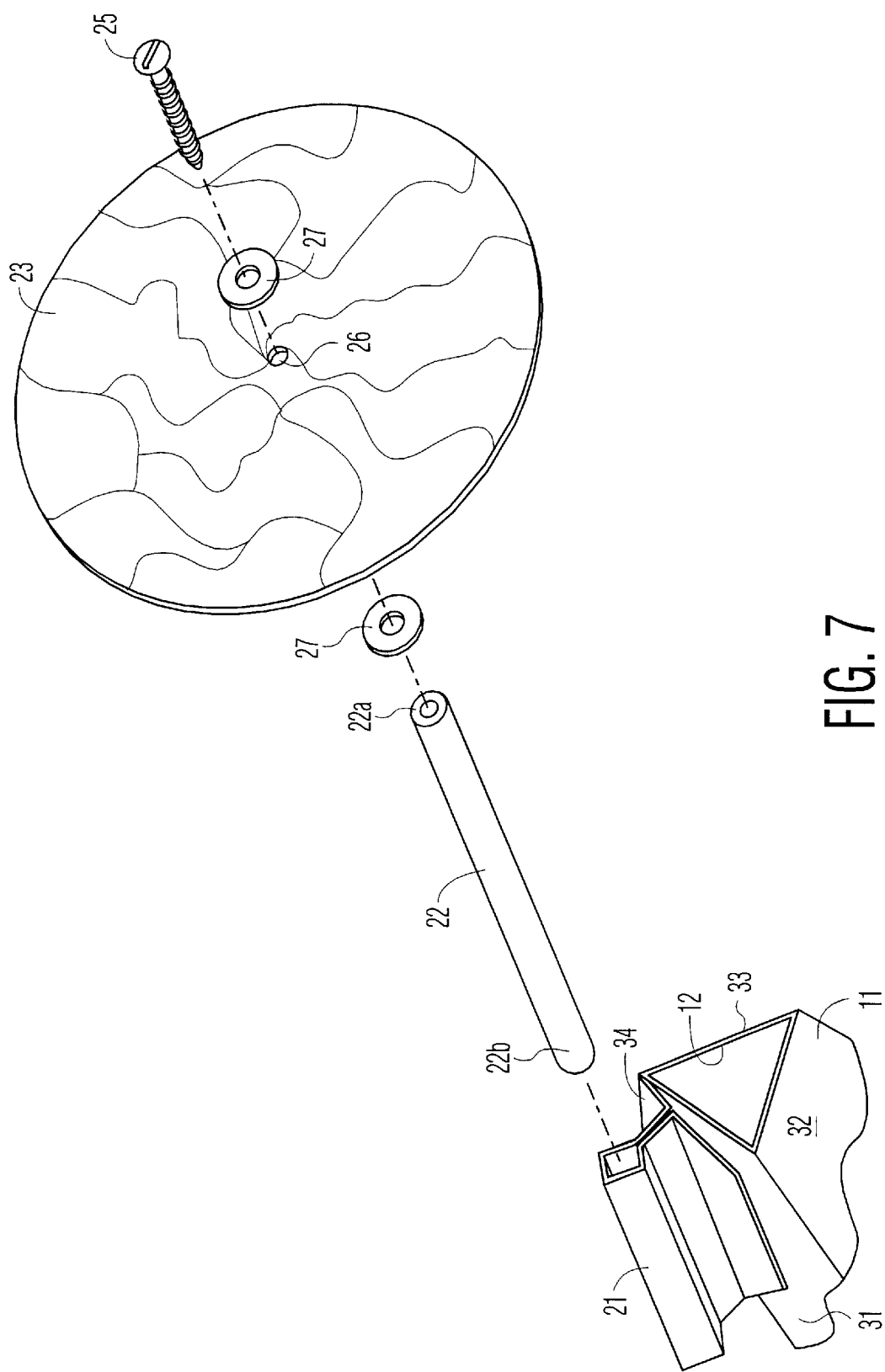
FIG. 7 is an exploded perspective view showing a moveable image and mounting means therefor according to this invention.

The binocular kaleidoscope chosen to illustrate the present invention, and shown in FIGS. 1 and 2, comprises a generally V-shaped housing 10, the base 11 of which is truncated to define an opening 12 (see also FIG. 7). The two arms 13 and 14 of the housing 10 diverge from the base 11. Preferably, each arm has a triangular cross-sectional shape, (see also FIG. 5).

Figure 5:
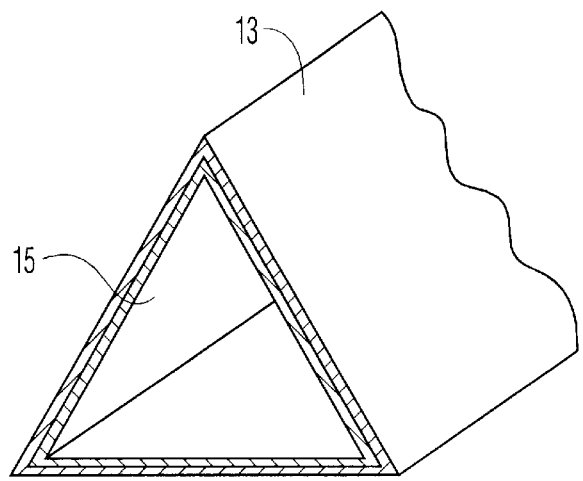
FIG. 5 is a fragmentary cross sectional view, taken along line 5—5 of FIG. 1.

Advantageously, each arm 13, 14 is provided with a telescoping extension 15 and 16, respectively, also preferably having a triangular cross sectional shape, as may be seen in FIGS. 1 and 5. Extensions 15 and 16 are slideable more or less into and out of their respective arms 13 and 14 so as to effectively adjust the lengths of arms 13 and 14. In this way, the spacing A (FIG. 2) between the free ends of arm extensions 15 and 16, into which the viewer looks when using the kaleidoscope, can be adjusted to match the spacing between the eyes of the user. However, use of telescoping extensions 15 and 16 is not essential, and the binocular kaleidoscope can function adequately by having the user look Into the free ends of arms 13 and 14. Moreover, if desired, a lens may be incorporated into the opening 12 of base 11 to broaden the user's field of view.

Mounted on base 11 of housing 10 is a tubular support 21 (FIGS. 1, 2, and 7) adapted to rotatably support a shaft 22. Secure to one end of shaft 22 is a carrier for an image, in this case the carrier being a circular disk 23 of a suitable self-supporting material bearing an image 24. As shown in FIG. 7, disk 23 may be secured to the end of shaft 22 by means of a fastener, such as a screw 25, which passes through a hole 26 in the disk and is threaded into the end 22a of shaft 22, suitable washers 27 being used to sandwich disk 23 between them to help secure the connection.

The image 24 carried by disk 23 is preferably colorful in nature, and may be printed on the surface of the disk, or formed by an arrangement of pieces of colored elements secured to the disk surface. Any other way of applying a multi-colored or a multi-patterned image to the surface of the disk may be used. For example, the disk 23 and image 24 may be transparent or translucent, the disk 23 could be a flat container loosely holding two or three dimensional objects, or the disk could be a flat container holding a clear liquid in which colorful objects are submersed.

Image-carrying disk 23 may be mounted on housing 10 by sliding the free end 22b of shaft 22 through tubular support 21, until shaft end 22b projects beyond support 21. In this way, disk 23 and the image which it carries are brought directly in front of opening 12 in the base 11 of housing 10. In addition, free end 22b of the shaft is available to be gripped by the fingers of the user and spun around the axis of the shaft so as to sweep the image on the disk past opening 12, the disk 23 being rotatable with shaft 22.

Since the shaft 22 can be readily slipped into and out of support 21, any particular shaft, and the disk 23 it carries, can be easily removed from support 21 and replaced with a different shaft carrying a disk bearing a different image. Consequently, use of the kaleidoscope is kept interesting since a variety of images can be viewed.

Figure 3A:
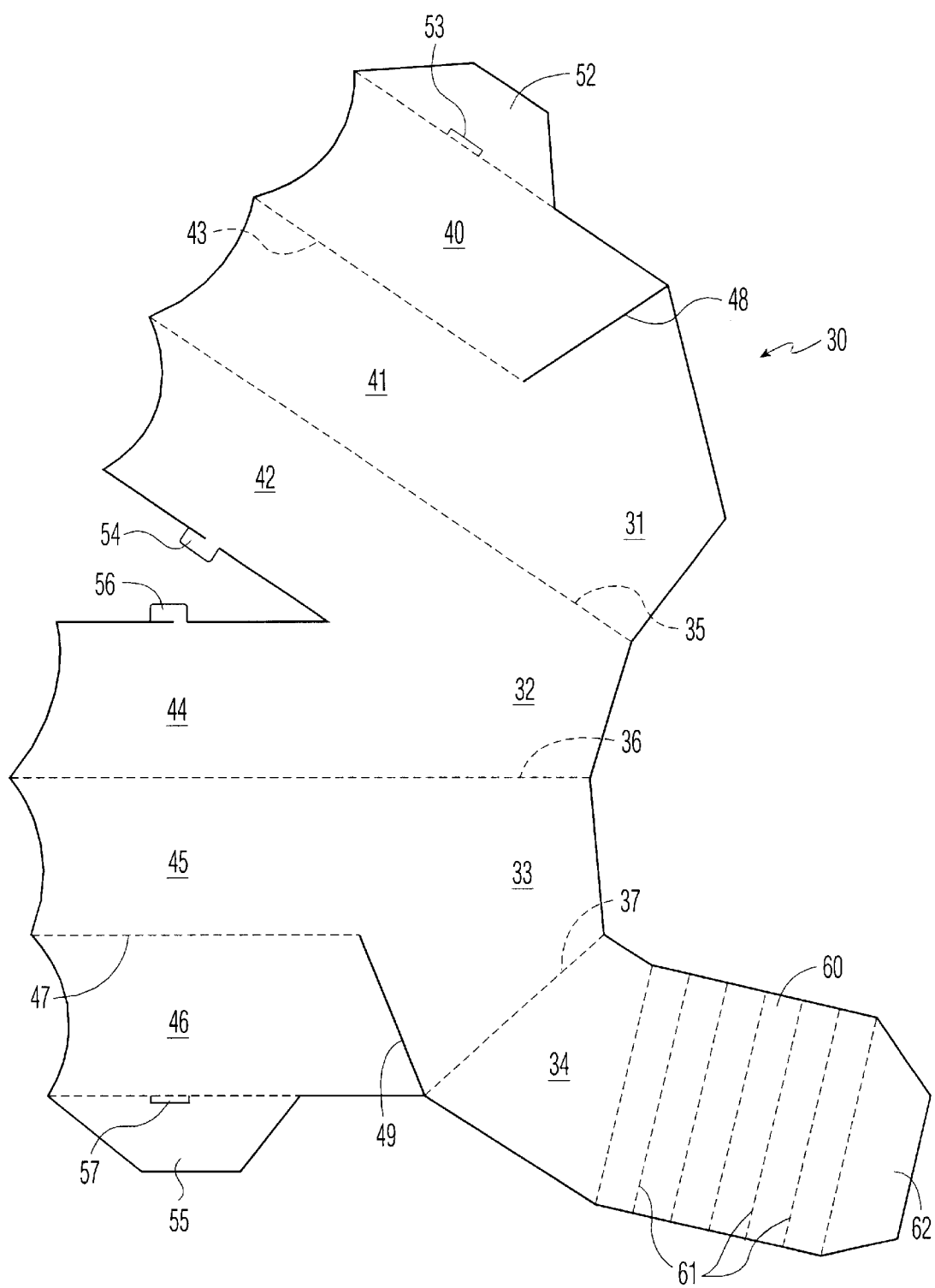
FIG. 3A is a plan view of a piece of flat sheet material which can be folded to form a binocular kaleidoscope according to this invention.
Figure 4:
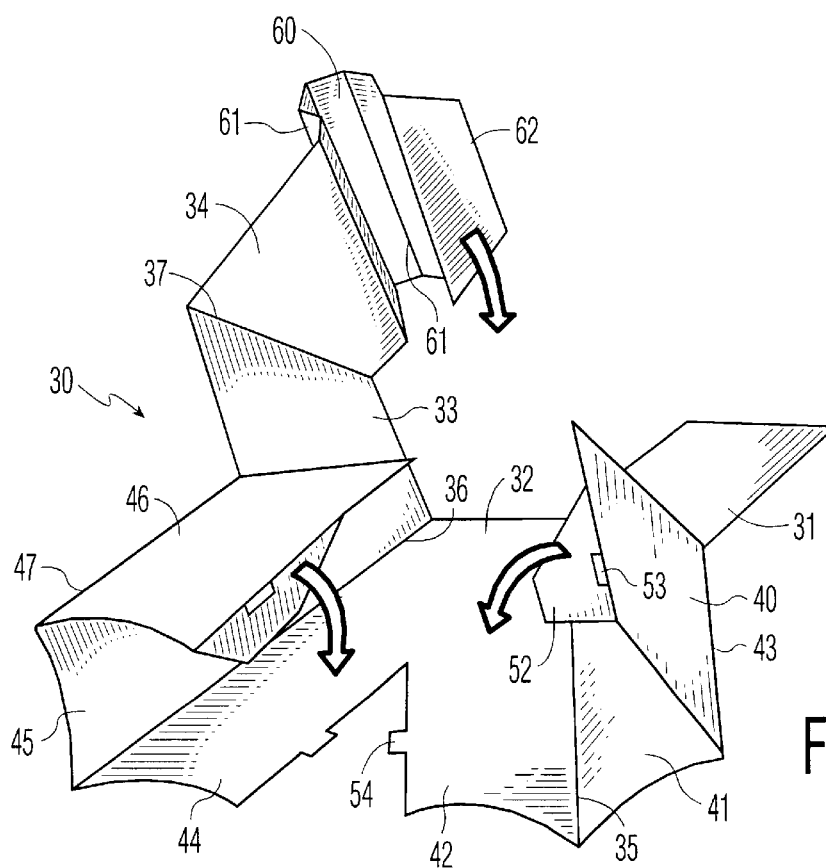
FIG. 4 is a perspective view showing the sheet material of FIG. 3A being folded to produce the binocular kaleidoscope.

An aspect of the present invention is the manner in which the housing 10 of the kaleidoscope is fabricated. Housing 10, including base 11, arms 13 and 14, and shaft support 21 may be formed of a single piece of sheet material, illustrated in flat pattern form in FIG. 3A. The sheet 30 of this figure is shown partially folded in FIG. 4. Areas 31, 32, 33, and 34 of sheet 30 will, when folded along lines 35, 36, and 37 define base 11 of housing 10. Areas 40, 41, and 42 of sheet 30 will, when folded along lines 43 and 35 form housing arm 14. Similarly, areas 44, 45, and 46 of sheet 30, when folded along lines 36 and 47 will form housing leg 13. Lines of severance 48 and 49 separate area 40 from area 31 and area 46 from area 33, respectively, the severance lines helping distinguish the base 11 of the housing from the arms 13 and 14. In FIG. 3A, fold lines are shown as broken lines, and lines of severance are shown solid.

A connector tab 52 extends from area 40 and is secured to area 42 after housing leg 14 is folded into its final shape. Tab 52 may be connected to the surface of area 42 by a suitable adhesive. Alternatively, or in addition, tab 52 may be formed with a slot 53 adapted to accommodate a locking tab 54 projecting from the edge of area 42. Similar tabs 55 and 56, corresponding to tabs 52 and 54, project from areas 46 and 44, respectively, for the same purpose as described above with respect to tabs 52 and 54. Thus, locking tab 56 cooperates with slot 57 to secure the folded sheet material into the triangular form of leg 13.

Due to the presence of the lines of severance 48 and 49, base 11 of housing 10 maintains a triangular cross-sectional shape larger than the triangular cross-sections of arms 13 and 14. As a result, an opening 58 (FIGS. 1 and 2) is created in base 11 spaced from opening 12 in the direction of arms 13 and 14. Opening 58 permits light to enter base 11 and pass through the hollow base and opening 12 so as to illuminate the image 24 adjacent to opening 12. Thus, if the disk 23 and image 24 are transparent or translucent, as described above, the image will be both front and back lit. The front illumination will be ambient light passing through opening 58, and the back illumination will be ambient light behind the disk. If the disk 23 is opaque, it will be lit on the front by ambient light passing through opening 58.

Extending from area 34 of sheet 30 is an area 60 having seven parallel fold lines 61 and terminating in a connection tab 62. When folded along all seven lines 61, area 60 defines tubular support 21 for shaft 22. Tab 62 is secured to the exterior of leg 14, such as by a suitable adhesive or any other appropriate fastening means.

Figure 3B:
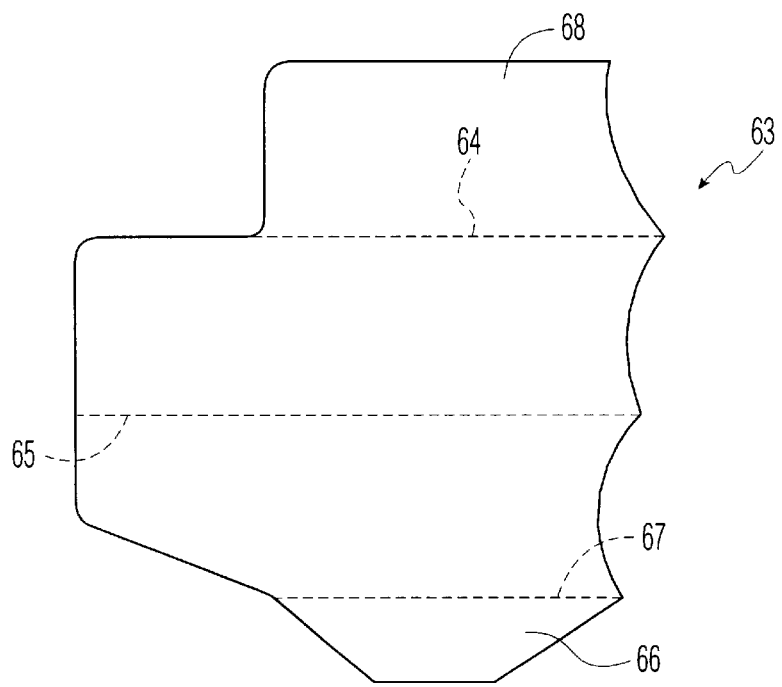
FIGS. 3B and 3C are plan views of pieces of sheet material which can be folded to form the telescoping extensions of the binocular kaleidoscope.
Figure 3C:
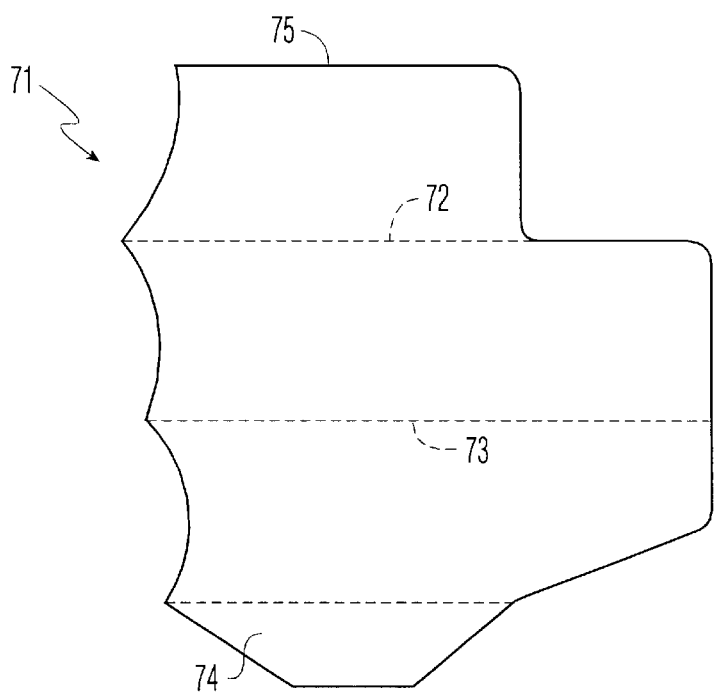

FIGS. 3B and 3C illustrate the sheet pattern which can be folded to produce the telescoping extensions 15 and 16 (FIGS. 1 and 2). Sheet 63 when folded along lines 64 and 65 produce the triangular cross-section extension 15, and connector tab 66, folded along line 67, is attached to the outer surface of area 68 of sheet 63 to hold the extension 15 in the condition shown in FIG. 1. Similarly, sheet 71 of FIG. 3C is folded along lines 72 and 73, and connector tab 74 is attached to area 75 to form telescoping extension 16.

Figure 6:
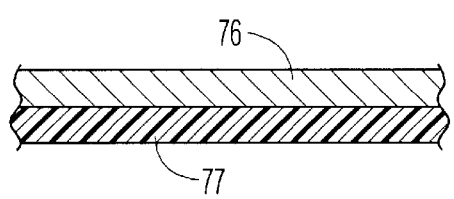
FIG. 6 is a cross sectional view of the sheet material used to form the binocular kaleidoscope of this invention.

It is contemplated that housing 10 and extensions 15 and 16 may be formed of stiff paperboard 76 (FIG. 6) lined with a layer of a reflective plastic 77, such as a mirror-like mylar.

When the paperboard is folded to create housing 10 and extensions 15 and 16, the reflective layer 77 will form the interior of base 11, arms 13 and 14, and telescoping extensions 15 and 16. In this way, the reflective plastic serves the usual purpose of the internal mirrors of a conventional kaleidoscope.

As best seen in FIG. 2, the longitudinal axes 13a and 14a of the legs 13 and 14, including the extensions 15 and 16 if such are employed, extend through opening 12 at the end of base 11 of the kaleidoscope housing. Consequently, each eye of the user has a direct view of the image 24 on disk 23, as well as the reflections of the image along the interior walls of arms 13 and 14. In this way, due to the parallax effect created by the spacing of the eyes, the viewer perceives both the directly viewed image and the reflected image as if in three dimensions.

It should be pointed out that the mirrored inner surfaces of areas 31, 32, and 33 of base 11 form a kaleidoscope section additional to the arms 13 and 14. Thus, in addition to receiving the kaleidoscopic effects of the mirrored interiors of arms 13 and 14, the moving image seen by the viewer is enhanced by the kaleidoscopic effect of the interior of base 11.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A binocular kaleidoscope comprising:
   a generally V-shaped housing, one end of the housing being defined by the base of the V, the base being truncated to define an opening,
   the two arms of the V-shaped housing being hollow tubes diverging from the base of the V, the longitudinal axes of both arms passing through the opening at the base of the V, and
   a movable image adjacent to the opening at the base of the V, the image being directly viewable through the opening when looking along the length of each arm of the housing,
   whereby when both eyes of a person using the kaleidoscope are brought close to the free ends of the hollow arms of the housing, the movable image will be viewed directly and simultaneously by both eyes.

2. A binocular kaleidoscope as defined in claim 1 wherein each of the arms of the body has a mirrored interior.

3. A binocular kaleidoscope as defined in claim 1 wherein each of the arms of the body has a triangular cross-sectional shape defining three walls at acute angles to one another, at least two of the walls having interior mirrored surfaces.

4. A binocular kaleidoscope as defined in claim 1 wherein each of the arms of the body is provided with a telescoping extension, the extensions of each arm being slidable longitudinally with respect to the arm so as to adjust the lengths of the arms, whereby the spacing between the free ends of the arms is adjustable to conform to the spacing between the eyes of the user.

5. A binocular kaleidoscope as defined in claim 1 wherein the movable image is mounted on a carrier, a shaft extending from the carrier, and support means mounted on the housing for rotatably supporting the shaft.

6. A binocular kaleidoscope as defined in claim 5 wherein the carrier is a piece of self-supporting sheet material bearing the image, the shaft extends perpendicular to the plane of the sheet material, and the support means is a tube rotatably accommodating the shaft.

7. A binocular kaleidoscope as defined in claim 6 wherein the end of the shaft opposite the image carrier extends beyond the support tube so that it can be manipulated by the user to rotate the image.

8. A binocular kaleidoscope as defined in claim 6 wherein the shaft is slidable longitudinally into and out of the support means so that different carriers having different images can be inserted into the support means.

9. A binocular kaleidoscope as defined in claim 1 wherein the V-shaped housing is formed in its entirely of a single piece of folded sheet material.

10. A binocular kaleidoscope as defined in claim 9 wherein the sheet material is lined with a reflective material.

11. A binocular kaleidoscope as defined in claim 10 wherein the sheet material is a paperboard product, and the lining is a reflective plastic layer adhered to one face of the paperboard.

12. A binocular kaleidoscope as defined in claim 9 wherein the movable image is mounted on a carrier, a shaft extending from the carrier, support means mounted on the housing for rotatably supporting the shaft, and the support means being formed as part of the single piece of folded sheet material.

13. A binocular kaleidoscope as defined in claim 1 including a second opening in the base spaced from the first opening in the direction of the arms of the V, the second opening permitting light to enter the base and pass through the first opening to illuminate the movable image.

* * * * *